C. L. WEIL.
APPARATUS FOR INDICATING THE RATE OF FLOW OF FLUIDS IN PIPES.
APPLICATION FILED DEC. 18, 1913.
1,214,853.
Patented Feb. 6, 1917.
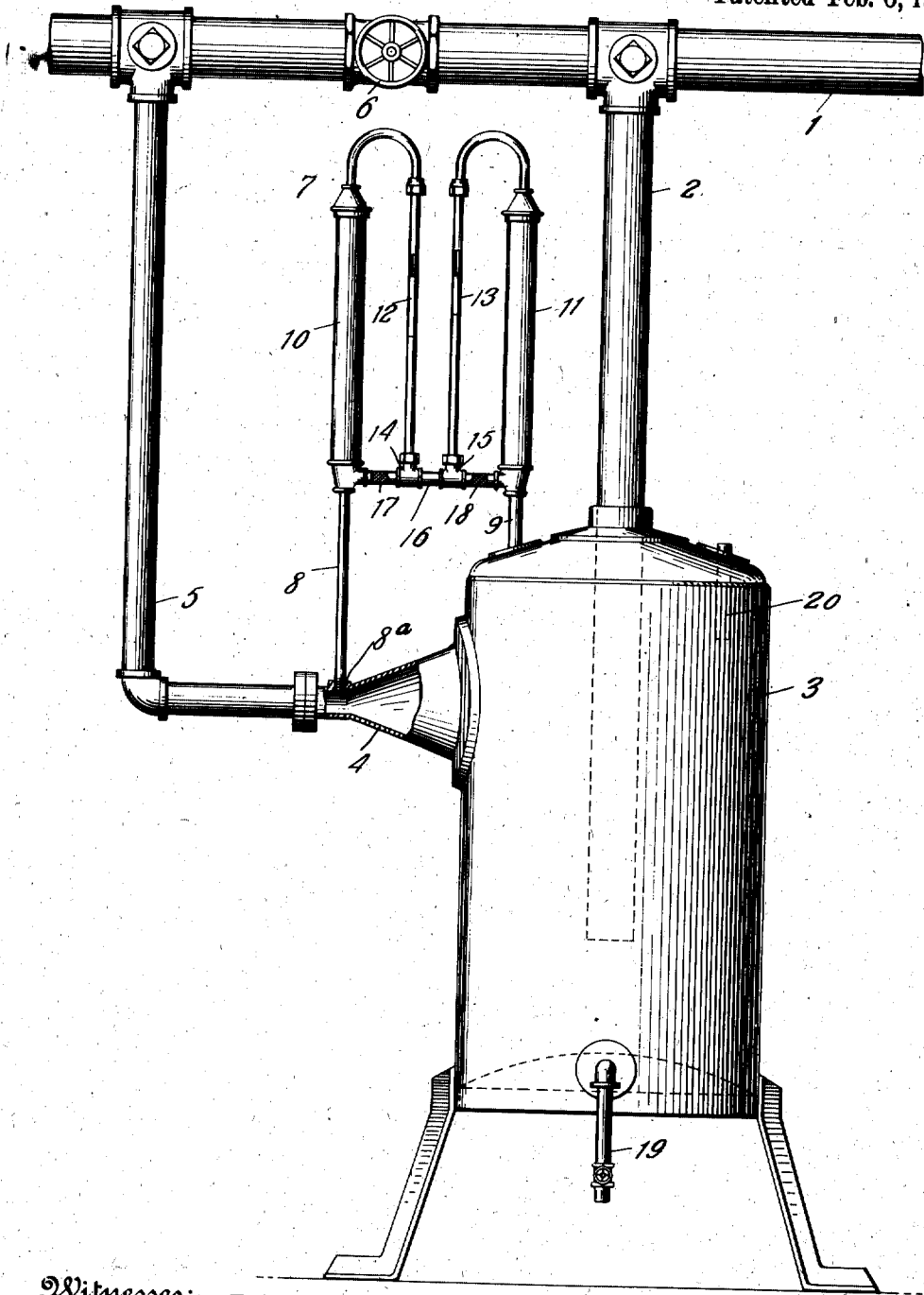

UNITED STATES PATENT OFFICE.

CHARLES L. WEIL, OF ST. CLAIR, MICHIGAN.

APPARATUS FOR INDICATING THE RATE OF FLOW OF FLUIDS IN PIPES.

1,214,853.  Specification of Letters Patent.  Patented Feb. 6, 1917.

Application filed December 18, 1913. Serial No. 807,408.

*To all whom it may concern:*

Be it known that I, CHARLES L. WEIL, a citizen of the United States, residing at St. Clair, in the county of St. Clair and State of Michigan, have invented certain new and useful Improvements in Apparatus for Indicating the Rate of Flow of Fluids in Pipes, of which the following is a specification.

This invention relates to apparatus for indicating or measuring the rate of flow of fluids in pipes or tubes. The invention is applicable to the measurement of the rate of flow of any fluid, but it is especially useful in connection with gases or vapors, and more particularly for use in indicating the rate of flow of steam.

According to my invention, the fluid flowing in a tube is made to pass through a relatively large closed chamber and the rate of flow of the fluid is indicated by the difference between the pressure of the fluid in this chamber and the pressure of the fluid in a relatively small pipe into which it flows on leaving the chamber.

I am aware that the difference between the pressures of a fluid at different points in its course has been used to indicate the rate of flow of the fluid, but so far as I am aware, in all prior devices utilizing differential pressures for this purpose use has been made of a short throat piece of cross-section less than that of the tube in which the fluid is flowing, inserted in said tube by means of converging and diverging pipes which are connected to said throat piece at their small ends and connected with said tube at their large ends. A principle upon which the operation of these meters depends is that a liquid may be made to flow uniformly through a gently expanding frustum of a cone without material loss of head. The measurement of rate of flow, according to my invention, does not involve this principle. The type of differential meter involving converging and diverging tubes has been found fairly satisfactory in measuring the rate of flow of liquids, but it is not suitable for use as a gas or vapor meter. One reason for this is that with this type of meter applied to gases and vapors it is impossible to get a sufficient difference in pressure to be conveniently measurable. Another reason for the failure of this type as a gas or vapor meter is that passing a gas or vapor through a diverging tube results in what is termed "wire-drawing," that is, the vapor does not evenly and uniformly fill the expanding frustum and, therefore, the principle upon which these meters work does not obtain in the case of gases and vapors. My invention, on the other hand, works extremely well as a gas or steam meter since it necessitates no use whatever of diverging tubes.

The accompanying drawing represents a side elevation of a form of apparatus involving and carrying out my invention.

In the drawing, 1 represents the pipe in which the fluid is flowing. 2 represents a pipe branching from pipe 1 and connecting with the chamber or drum 3. It is desirable that the pipe 2 should extend into the chamber 3, as indicated in the drawing. The chamber 3 has a conical outlet 4, to which is attached a pipe 5, which leads back to the main pipe 1. Between the points where the pipes 2 and 5 join the pipe 1 is a valve 6, which may be closed thereby forcing all the fluid flowing in the pipe 1 through the chamber 3. A differential pressure gage 7 is connected with the chamber 3 and with the outlet 4 at a point $8^a$, where the internal cross-section of the outlet 4 is the same as that of the pipe 5. The gage may be connected at any point in the pipe 5, instead of 8, but if it is connected at a considerable distance from $8^a$, an error will be introduced owing to the drop of pressure along the pipe 5, due to friction. The differential pressure gage illustrated consists of two tubes, 8 and 9, leading from the points at which the pressure is to be measured. At the outer ends of these tubes are attached the air chambers 10 and 11. These air chambers are connected to the respective ends of a U tube, which consists of two glass tubes 12 and 13, connected by the T's 14 and 15 and the tube 16. For convenience and strength in construction, blind nipples 17 and 18 are inserted between the T's 14 and 15 and the lower portion of the air chambers 10 and 11. The U tube is partially filled with a liquid, whose height in the tubes 12 and 13 indicates the difference between the pressures at the points at which the tubes 8 and 9 are attached. If the apparatus is to be used as a gas or vapor meter, a liquid of specific gravity about that of water, may be conveniently used in the U tube. I prefer to use water, to which, if desired, some coloring matter may be added. If the apparatus is to be used as a steam meter, a pipe 19 may be inserted into the bottom of the chamber 3 to drain off any water which may condense from the steam. A thermometer-well 20 may be inserted in the chamber 3, if desired.

The operation of the apparatus is as follows:—When the apparatus is to be used, the valve 6 is first closed, thereby forcing all the fluid flowing in the pipe 1 through the pipe 2, the chamber 3 and the pipe 5. When the fluid has entered the chamber 3 through the pipe 2 its velocity in the chamber 3 becomes negligible owing to the large cross-section of the chamber. When the fluid enters the pipe 5 it again acquires an appreciable velocity. By means of the gage 7 the difference between the pressure of the practically stationary fluid in the chamber 3 and the moving fluid at the point $8^a$ is indicated. From this difference of pressure the velocity of the fluid at the point $8^a$ may be readily calculated by means of the formula $$V = \sqrt{2gh},$$

where $h$ represents the difference in pressure indicated by the gage 7, expressed in terms of feet of head of the fluid whose flow is being measured, and $g=32.16$. From this velocity the rate of flow in cubic feet per second may be obtained by multiplying by the internal cross-section of the outlet 4 at the point $8^a$. This may be put into terms of pounds per second, the density of the fluid being known. I am aware that the application of this formula to readings obtained from the apparatus described will not give theoretically correct results owing to the fact that the fluid in the chamber 3 is not absolutely at rest. A further inaccuracy is introduced if the apparatus is used as a gas or vapor meter by the fact that the density of the gas or vapor is somewhat different at the point $8^a$ from what it is in the chamber 3 owing to the difference of pressure. But in practice I find that both of these errors are so slight that no correction need be made for them in applying the theoretical formula. In order to render the use of the machine more convenient in practice, tables may be supplied with it, from which the rate of flow may be found directly from the reading of the differential pressure gage 7 without any computation, or a scale based upon such a table may be attached to the differential pressure gage so that the rate of flow may be read off directly.

The air chambers 10 and 11 serve to prevent the fluid from coming in contact with the measuring liquid in the U tube. This is very desirable in case the apparatus is to be used as a steam meter, since it prevents condensation of the steam in the U tube.

If the apparatus is used in connection with steam, it serves not only as a steam meter but also as a separator, since bringing the steam to rest in the chamber 3 permits the entrained water to separate from the steam and collect in the bottom of the chamber, whence it may be withdrawn through the pipe 19.

I wish to have it understood that the specific apparatus which I have described is merely an example of an application of my invention, which is by no means limited to such apparatus. It is obvious, for example, that any form of differential pressure gage might be used instead of that which I have illustrated or separate pressure gages attached at the points $9^a$ and $8^a$ might be used without departing from my invention.

I claim as my invention:—

1. A fluid meter consisting of a main pipe in which the fluid is flowing, a closed receptacle of relatively large cross-section connected to said main pipe, a pipe of relatively small cross-section leading from said closed receptacle and connecting with said main pipe at a different point, a valve in said main pipe between the point at which said receptacle is connected to said main pipe and the point at which said outlet pipe is connected with said main pipe, and means for measuring the difference between the pressure of the fluid in said receptacle and the pressure of the fluid at a point in said oulet pipe.

2. A combined steam meter and separator consisting of a closed receptacle into which the steam is introduced and of so large a cross-section that the steam in it is practically at rest, a drain pipe connecting with the bottom of said receptacle, an outlet pipe leading from said receptacle, and means for measuring the difference between the pressure of the fluid in said receptacle and the pressure of the fluid at a point in said outlet pipe comprising a U tube containing a liquid, and air chambers inserted between the ends of said tube and the points at which the pressure is to be measured.

In testimony whereof, I have hereunto signed my name in the presence of witnesses.

CHARLES L. WEIL.

Witnesses:
R. W. BYERLY,
A. M. HOUGHTON.